Nov. 28, 1961 G. W. HOLLIS 3,010,744

TRACTOR ATTACHMENTS

Filed March 27, 1957 2 Sheets-Sheet 1

INVENTOR.
Grady W. Hollis

BY
Webb, Mackey & Burden
HIS ATTORNEYS

Nov. 28, 1961 G. W. HOLLIS 3,010,744

TRACTOR ATTACHMENTS

Filed March 27, 1957 2 Sheets-Sheet 2

INVENTOR.
Grady W. Hollis
BY Webb, Mackey & Burden
HIS ATTORNEYS 3,010,744

TRACTOR ATTACHMENTS

Grady W. Hollis, Lillie, La., assignor to Pittsburgh Forgings Company, Coraopolis, Pa., a corporation of Pennsylvania Filed Mar. 27, 1957, Ser. No. 648,834
4 Claims. (Cl. 287—54)

This invention pertains to tractor attachments, and more particularly it relates to an attachment adapted for supporting a multiplicity of plows, discs and the like. The device is most advantageously used in connection with a tractor provided with a hydraulically controlled lift mechanism so that the tools may be raised and lowered automatically.

This application is a continuation-in-part of my application Serial No. 549,007, filed November 25, 1955, now abandoned. While the device as disclosed is shown mounted to the rear of a tractor, it will be understood that this showing is by way of example only, and that the same arrangement might be placed on another vehicle or tractor which is provided with its lift mechanism at the front thereof.

One of the main object of the invention is the provision of a principal tool support beam which may be quickly attached and removed from the tractor.

Another object is the provision of a plow arm used in connection with the support beam and a unique arrangement for attaching and removing the same.

A further object of the invention is to provide a means of quickly shifting and spacing plow arms or cultivator shanks longitudinally along the principal support beam so that several of the same may be quickly spaced and securely locked to any desired row width.

Locking wedges as hitherto used or attempted for this purpose of quick detachment and relocking at a new location have been unsatisfactory because of being involved more or less directly with the forces resisting the leverage applied by the arm or shank parts. Distortion, crushing, or shifting of the parts quickly relaxed the few thousandths of an inch of strain by which the wedge was able to maintain its grip and the arms became loose. To be workable according to prior practices, wedge and socket parts had to be so huge that economy was lost and their very bulkiness made them impractical. I provide a compact double wedged system which has proved highly satisfactory, consisting of a tightly driven primary wedge and secondary wedge surfaces presented by lugs which grip legs fixed on the underside of the support beam. I have found that with this grip tight, it isolates the disturbances so that the forces which will be transmitted to the driven primary wedge are diminished and its tightness is not normally disturbed. Thus the driven primary wedge draws down the secondary wedging surfaces and locks them solidly gripped together and thereafter the latter are effective to cooperate by shielding the primary wedge to keep it tight.

One important object in line with the foregoing objective is the provision, in such a double wedged locking system for tool arms, of a wear take-up device enabling the driven wedge to continue to have proper space during usage so as not to be driven in too far nor prevented from entering far enough into its assigned space.

Yet another object of the invention is the provision of a plow supporting means which may be set at various plowing angles and which employs the thrust of the earth against the same to assist in maintaining such angular setting.

Other objects and advantages of the invention will become apparent in the course of the following detailed description, when viewed together with the accompanying drawings which show a preferred embodiment thereof and in which.

Figure 1:
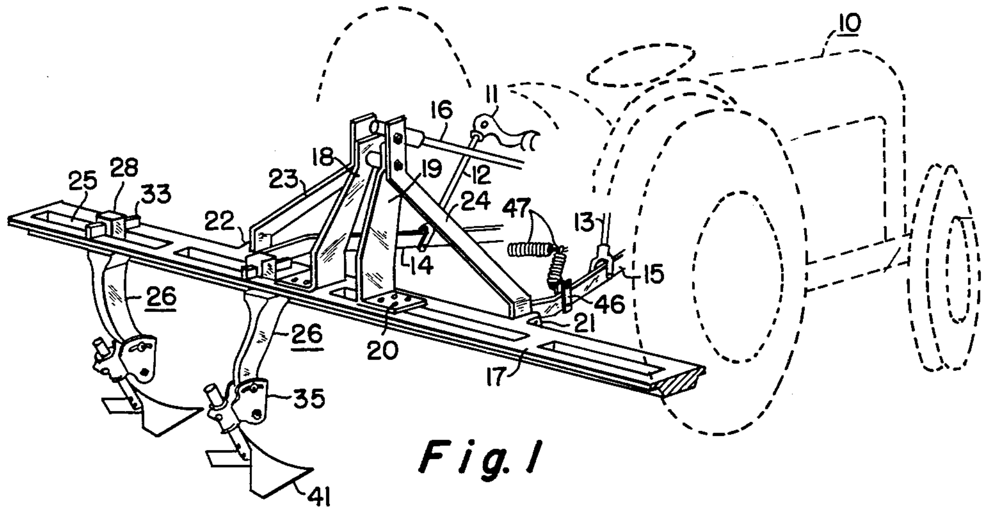
FIGURE 1 is an isometric view of an assembled device embodying my invention in a tractor attachment.

More specifically with reference to FIGURE 1 of the drawings, numeral 10 designates a tractor which is provided with hydraulically controlled lift arms 11 and lift rods 12 and 13. The rods 12 and 13 are, of course, pivotally attached to the lift arms at the upper ends thereof, and at their bottom ends are pivotally affixed to draft bars 14 and 15. The upper link 16 is pivotally affixed to the rear of the tractor 10 at its inner end and at its outer end is arranged for pivotal attachment to my invention in a plow attachment.

The main tool supporting element of my invention is designated by the numeral 17 and consists of an elongated one-piece beam made of a heavy, metal casting. The beam 17 is supported by the tractor in the manner illustrated in FIGURE 1. The two spaced arms 18 and 19 are mounted to the upper face of the beam 17 by means of bolts 20, with the upper extremities of the arms terminating in a yoke. On the inside face of the support beam 17 are two brackets 21 and 22, cast integrally with the beam and which serve as anchor supports for two outer arms 23 and 24, and also for the outer ends of the draft bars 14 and 15. The ends of these last mentioned arms are attached by pins (not shown) placed through the same and through the brackets 21 and 22.

As seen in FIGURE 1, the main support beam 17 is provided with slots 25 extended through the beam and which permit the longitudinal spacing of plows which will be subsequently described.

Figure 2:
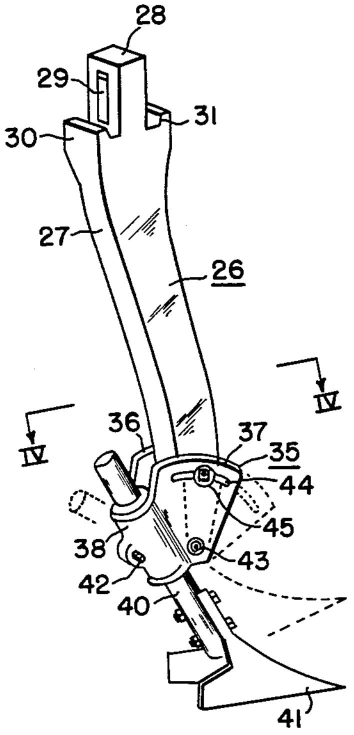
FIGURE 2 illustrates one of the plow support arms dismounted from the main support beam of the invention.
Figure 3:
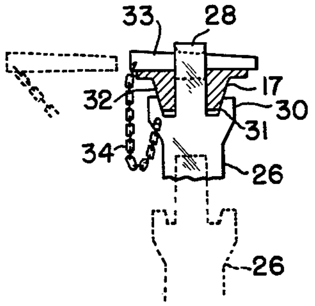
FIGURE 3 is a fragmentary sectional view from the side illustrating the manner of assembly and disassembly of one of the plow arms to the principal support beam.

The tool part or plow arm 26 as more clearly shown in FIGURE 2 is a heavy metal member made of a one-piece casting. The main stem 27 thereof is slightly curved away from a normal longitudinal axis so that a set of plows may be staggered from a single plane of plowing. Thus a transverse offset is produced between its ends to provide for shift of the lower end of each stem relative to the beam 17 when the upper end is selectively attached thereto in one position or in an about-faced position. The upper end referred to constitutes simply a rectangular extension 28 which is provided with an opening through the same indicated at 29. This upper end of the stem 27 is relieved by notches at opposite sides of the extension 28 to provide symmetrical side lugs 30, the inner sides 31 of which are tapered in the manner illustrated in FIGURE 3. This figure also illustrates the manner of mounting the plow arm 26 to the main beam 17. It will be noted that the sides of the legs of the beam 17 have also been cast with a taper 32 matching the tapers 31 of the plow arm 26. When the plow arm is moved from the position shown in dotted lines to the mounted position shown in solid lines, the upper extension 28 is moved into one of the cast slots 25 of the beam 17 and placed along the slot at a position for a desired row width with respect to other plows similarly mounted. A primary wedge 33 is then positioned in the eye of the opening 29 in the upper extension 28 and given a blow with a hammer. Due to the double wedging action of the above described primary wedge 33 and the interfaced engagement of the tapered members acting together, the plow arm is thus rigidly braced against movement in any direction. To remove the arm or to re-position the same laterally along the beam for row spacing, a single blow with a hammer at the small end of the wedge is sufficient to "unlock" the tapered members. To keep the wedge from being lost, it is attached to the plow arm 26 by means of a length of chain 34.

At the lower end of the plow arm 26 is a clevis arrangement designated generally by the numeral 35. The two, spaced side plates 36 and 37 are integrally formed with an elongated "boss" 38 which has been split along the back side as at 39. The boss is bored to receive the cylindrical shaft 40 of a plow 41 as illustrated in FIGURE 2 and the shaft is made fast in a desired setting by means of a bolt 42.

Figure 4:
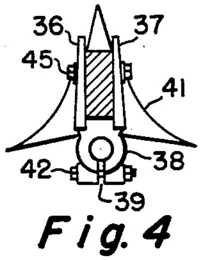
FIGURE 4 is a cross-sectional view taken along lines IV—IV of FIGURE 2.

Referring again to the side plates 36 and 37 of the clevis arrangement 35, it will be noted that they are spaced apart to receive the lower end of the plow arm 26 which is pivotally mounted between the plates by means of a bolt 43. It will be noted also that the plates vary in thickness from front to back. In fact, each plate is formed with a definite taper as illustrated in FIGURE 4. Each plate is also provided with an arcuate slot 44 with a shear bolt 45 extended through the plow arm 26 and through the slots 44 of both side plates 36 and 37. The clevis is moved in the plane indicated by the dotted lines of the drawing to set the plow at various angles for plowing. When the clevis is made fast in such position by the tightening of the bolt 45, any further thrust such as will occur when the plow is placed into the earth, will simply create a wedging action by the side plates against the shear bolt 45 and thus further tighten the clevis in position. It is preferred that the bolt 45 be of such size and material that it will shear under an extreme load and allow the plow to hang free, rather than to transmit such undue stress to the upper plow arm 26 where it is joined to the beam 17.

As a general rule, in the working of ground that has hidden roots or stones, an implement of the present nature may be subjected to many sudden stresses unless provision is made for the plows to "walk around" such obstructions. In the present invention the draft bars 14 and 15 are loosely connected at their inner ends (not shown) to mounting pins (not shown) provided on the tractor to permit considerable lateral movement of the support beam 17. On each side of these draft bars is provided a removable clamp 46 consisting of two flat plates, one bolted on each side of its respective draft bar. One end of an extension spring 47 is affixed to a clamp and its other end extended to a station point on the rear axle housing of the tractor. Thus, when the two springs are mounted under tension, a unique stabilizer is formed. Now, should one of the plows strike a small obstruction, it will simply pass around it and the greater tension in one spring will tend to pull the entire tool support beam 17 back into a central, axial alignment with the tractor.

Figure 6:
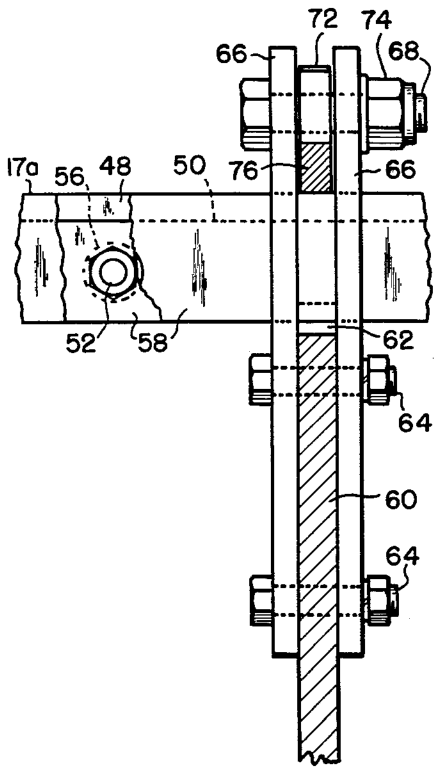
FIGURE 6 is a front view of the modification of FIGURE 5.
Figure 5:
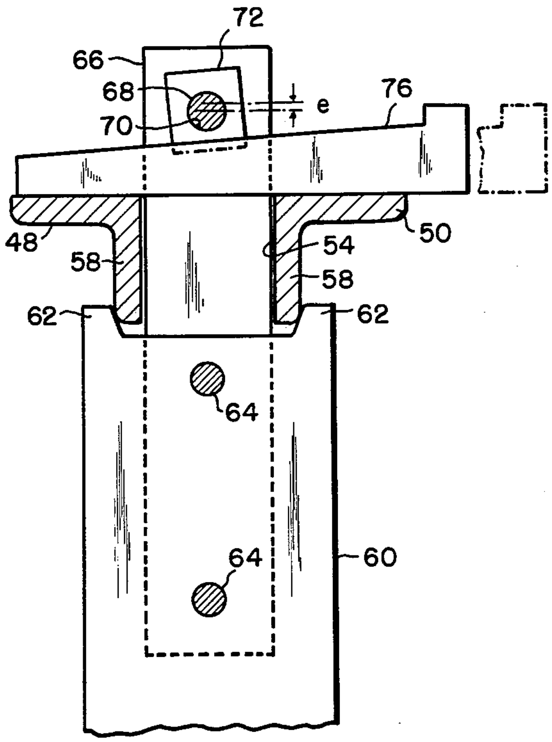
FIGURE 5 is a side sectional view corresponding to FIGURE 3 but showing a modification.

In the modification of FIGURES 5 and 6, I show a wear take-up device for use in keeping the double wedging members tight without preventing the primary wedge from entering far enough or requiring that it penetrate excessively deeply to be driven tight. A fabricated beam 17*a* forms the main tool supporting member consisting of parallel lengths 48 and 50 of single piece L-irons which are secured at spaced points together by means of short bolts 52 to define elongated tool slots 54 therebetween. A spacer sleeve 56 surrounds the shank of each bolt in the space between the L-irons and individual nuts are provided on the bolts 52 in the usual manner to draw down the L-irons solidly against opposite ends of the spacer sleeves. In this spaced relationship, the L-irons present an outer pair of coplanar flanges transverse to the mouth of the slot 54 and an inner pair forming parallel legs 58 on the beam bordering the slot at right angles to the flange first named.

A cultivator shank assembly to fit at selected points along the tool slot includes a wide arm member 60 of the proper length and offset between its ends for supporting a cultivator or other tool in the proper relation to the beam 17*a*. At the head the arm 60 is notched to provide widely spaced symmetrical lugs 62 which will wedge against the parallel legs 58 as they ride against the tapered sides of the notch to a stopping point short of the bottom of the notch. The arm 60 carries a pair of narrow side plates which are clamped thereupon by spaced bolts 64 and which provide shank extension legs 66 poking through the slot 54. The legs 66 are punched with bolt openings at the end and carry a short bolt 68 therebetween which fits in an eccentric opening 70 through a block 72 pivoted thereon. A self-locking nut 74 on the bolt 68 is drawn down a distance to make the legs 66 bear against the ends of the block 72 with sufficient friction to hold it where set but still enable it to pivot slightly to accommodate loads or to be rotated with a wrench into a different setting.

A wedge 76 is then positioned against the inside flat side of the block 72 in the space between the legs 66 and given a blow with a hammer to bridge it tightly across the coplanar flanges at the mouth of the slot 54. The described double-wedging action caused by the wedge 76 in moving the parts 58 and 62 together in a direction at right angles to the wedge motion produces a rigid braced relationship against further relative movement or play in any direction.

The pivot opening 70 in the block 72 makes it self-adjusting to square properly in surface contact with the wedge 76 whereas its eccentricity indicated at *e* gives one adjustment of clearance space to the wedge for each flat side selected on the block 72. There are, among others, three important practical values which attach, consisting of the assurance that the wedge has a full flat area to bear against, reducing wear and maintaining grip, the allowance for reasonable manufacturing variations in size without imparting efficiency of the wedge, and the provision of a take-up for ultimate wear. The referred to self-adjusting feature of the block is a great convenience in case the cultivator shank assembly is desired to be staggered to a different angle by reversing the arm 60 to an about-faced position on the beam 17*a*. In that case the wedge engaging surface on the block 72 confronts the wedge 76 at a reverse slope but the first blow on the wedge automatically pivots the block to the proper angle of setting.

The complete device of preceding FIGURES 1–6 is most simple in its construction and operation and eliminates the many bolts and nuts of former devices of this type and also the hours of time required to assemble their various units. The double wedging action of the beam and plow arm of FIGURES 3 and 5 prevents movevent in the joint which has heretofore been of great annoyance to operators. In former joints between similar parts this stability was acquired only by a multiplicity of braces and struts, all of which were time consuming in assembly and disassembly. The sliding interfaces of wedging contact provided by the secondary bracing surfaces hereof and by the primary wedge to lock them give solidarity to the present joint, and yet the single-blow separation procedure for the primary wedge and the symmetrical arrangement of the secondary surfaces to make them reversible, offer a quick change feature for adjusting that joint much easier than with former constructions.

The clevis arrangement with its wedging action to hold plows and other implements is found to be very satisfactory in the art of tractor attachments and it permits quick and easy settings for plowing.

As before stated, the present invention has been described in a particular embodiment wherein the hitch is mounted to the rear of a tractor, but it is to be understood that this has been by way of example only. Moreover, other constructional details might be changed without departing from the spirit and scope of the invention as defined by the following claims.

I claim:

1. In a double-wedged joint between tool parts, the combination of a beam part having a tool slot bordered by protruding legs, a tool part having an extension fitting in said slot and notched symmetrically at the sides to receive said legs which are arranged to wedge with positive operating clearance therein above the bottom of the notch, eccentrically mounted means set in said extension to present a wedge engaging side forming one end of a wedge slot to confront a wedge with the proper clearance, and a wedge which when forced by a blow into predetermined penetration in said slot causes the aforesaid parts to move part-way together and lock in a direction at right angles to the wedge motion.

2. In a double-wedged joint between tool parts, the combination of a beam part having a tool slot bordered by protruding legs, a tool part having an extension fitting in said slot and notched symmetrically at the sides to receive said legs which are arranged to wedge with positive operating clearance therein above the bottom of the notch, the symmetry of said notched sides enabling the tool part to be reversible between engaging the beam part in one position and in an about-faced position, eccentrically set, polygonal means pivoted in said extension so as to confront a wedge with the proper clearance, there being spaced legs on the extension engaging the ends of the polygonal means and carrying a tensioned fastener clamping the same to hold said polygonal means frictionally where it is set, and a wedge which when inserted between said extension legs and forced by a blow against said confronting polygonal means causes the parts aforesaid to move part-way together and lock in a direction at right angles to the wedge motion.

3. A quick attachment joint for double-wedging tool parts which are adapted to be fastened by quickly applied and released wedge element means, comprising a generally horizontally extending beam member having a generally vertically extending tool slot, a tool part disposed transversely of said beam member, said tool part presenting engageable means at opposite sides of the mouth of the slot for engaging the beam at points on opposite sides of the mouth, and carrying a fixed longitudinal extension protruding through the slot to an external point beyond the slot; and an eccentrically set, pivoted part in said extension for presenting different wedge engaging surfaces forming one side of a wedge slot through said extension, and a wedge positioned in said wedge slot.

4. A joint according to claim 3 wherein said pivoted part is polygonal and presents different wedge engaging sides forming the end of the wedge slot for changing the slot dimensions at that end in said extension.

References Cited in the file of this patent

UNITED STATES PATENTS

| | | |
|---|---|---|
| 4,320 | Eldred | Dec. 20, 1845 |
| 36,139 | Cooper | Aug. 12, 1862 |
| 404,010 | Macphail et al. | May 28, 1889 |
| 407,766 | Avery | July 30, 1889 |
| 413,230 | Hirshheimer | Oct. 22, 1889 |
| 817,696 | Dye | Apr. 10, 1906 |
| 917,762 | Hench | Apr. 13, 1909 |
| 931,125 | James | Aug. 17, 1909 |
| 961,044 | Sutton | June 7, 1910 |
| 1,124,106 | Buffalow | Jan. 5, 1915 |
| 1,443,050 | Smith et al. | Jan. 23, 1923 |
| 1,463,353 | White | July 31, 1923 |
| 1,780,397 | McKee et al. | Nov. 4, 1930 |
| 2,651,860 | Mork | Sept. 15, 1953 |
| 2,689,514 | Ferguson | Sept. 21, 1954 |
| 2,743,657 | Kriegbaum | May 1, 1956 |

FOREIGN PATENTS

| | | |
|---|---|---|
| 311,701 | Germany | Apr. 7, 1919 |